March 11, 1941.  E. W. THOMPSON ET AL  2,234,208
APPARATUS FOR PREPARING AND COUNTING FRUIT AND VEGETABLES
Filed July 16, 1937   3 Sheets-Sheet 1
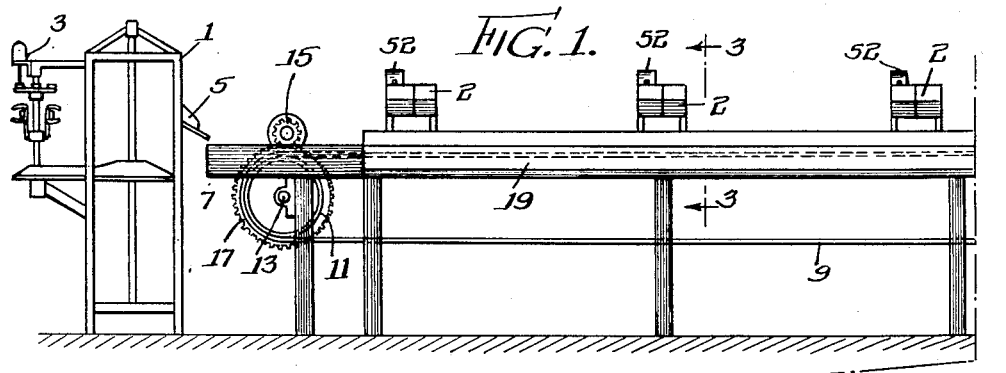
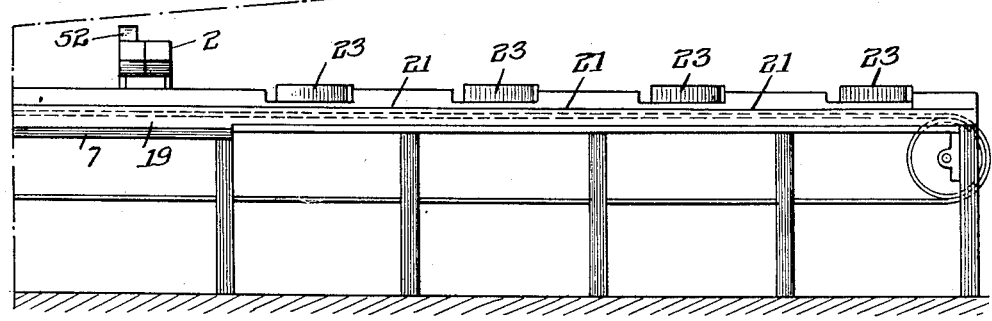
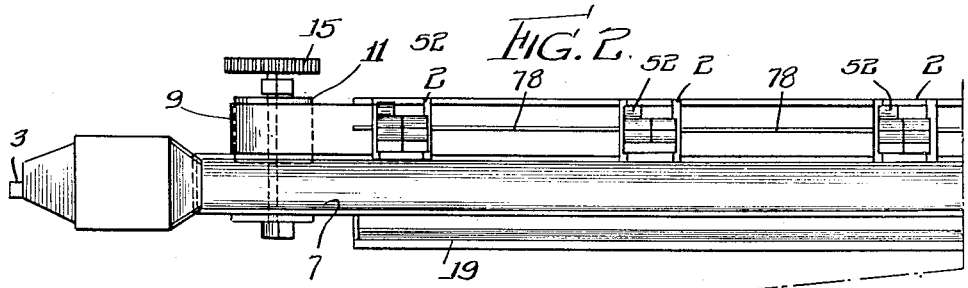
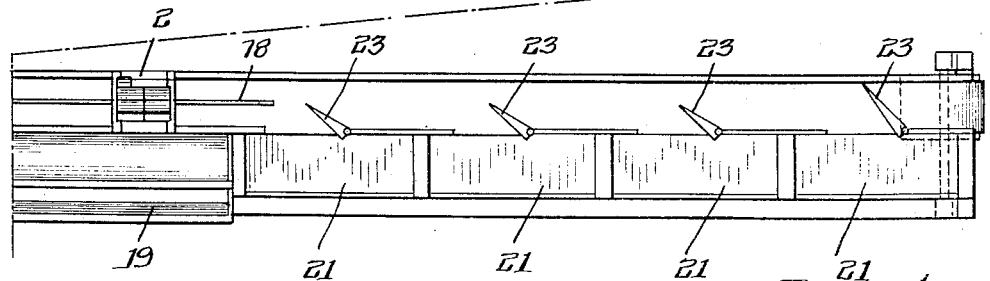
Inventors
Edward W. Thompson
and Henry A. Skog
By: Cox & Moore attys March 11, 1941.  E. W. THOMPSON ET AL  2,234,208
APPARATUS FOR PREPARING AND COUNTING FRUIT AND VEGETABLES
Filed July 16, 1937  3 Sheets-Sheet 2
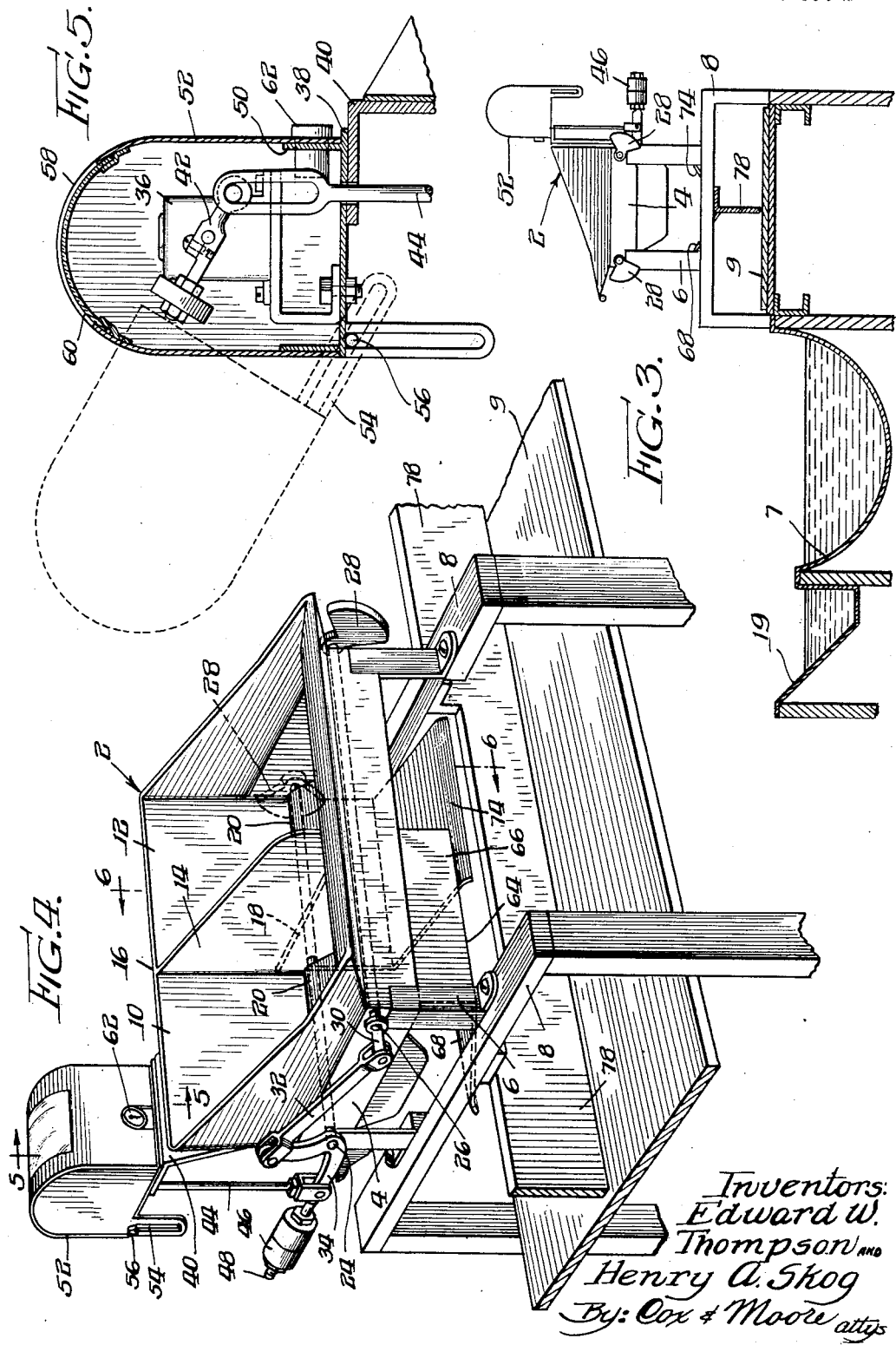
Inventors:
Edward W. Thompson and
Henry A. Skog
By: Cox & Moore attys

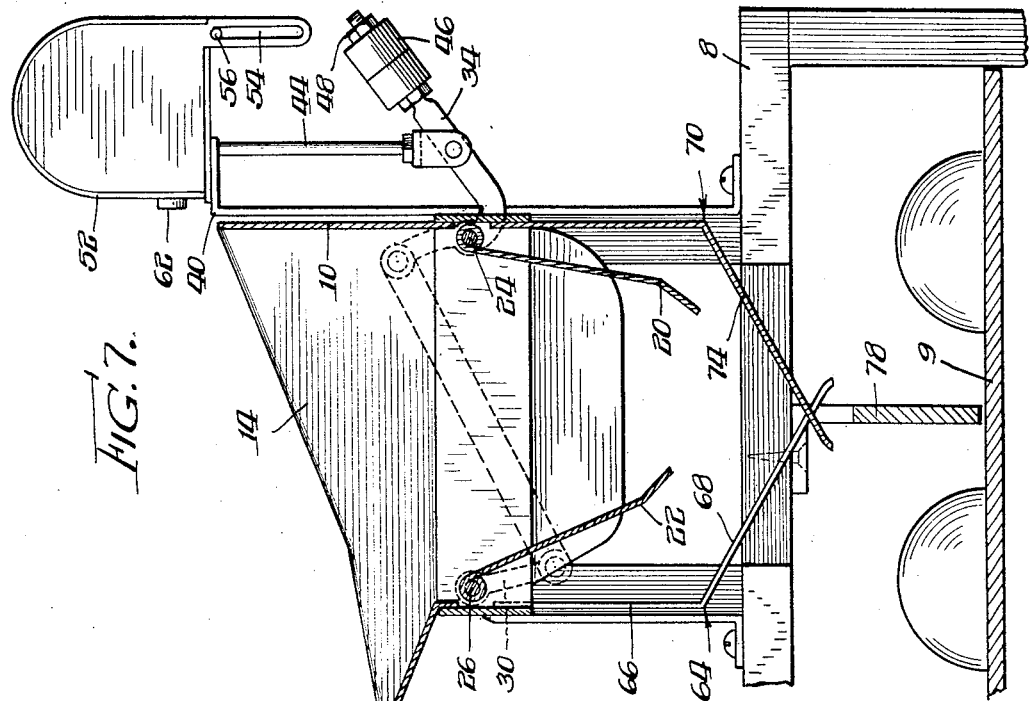
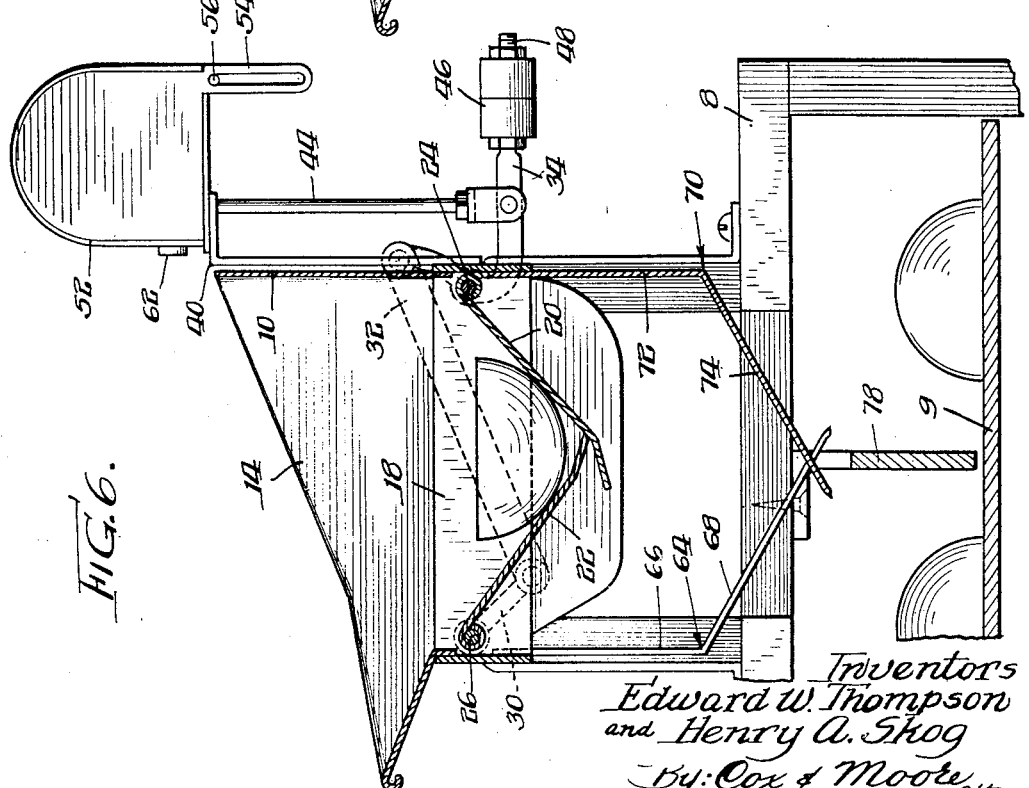

Patented Mar. 11, 1941

2,234,208

UNITED STATES PATENT OFFICE 2,234,208

APPARATUS FOR PREPARING AND COUNTING FRUIT AND VEGETABLES

Edward W. Thompson and Henry A. Skog, Olympia, Wash., assignors to Special Equipment Company, Portland, Oreg., a corporation of Oregon Application July 16, 1937, Serial No. 153,970

2 Claims. (Cl. 235—98)

This invention relates to means for preparing and counting fruits and vegetables whereby a finishing process may be imparted to the fruit and vegetables as they are continuously or substantially continuously conveyed from one processing station to another.

In the processing of fruit and vegetables, particularly fruit, the fruit is delivered in a whole condition to the receiving end of an automatic machine which, through a plurality of processes on the fruit as it is passed automatically through the machine, pares, splits, cores and/or pits the fruit and delivers it continuously onto conveying means. Due to peculiarities and irregularities in the variant shapes and sizes of the fruit and/or vegetables, it is sometimes difficult for the machine to remove all of the portions which should be removed, and it is therefore found necessary to hand process a certain percentage, relatively small, of the fruit as it is being conveyed from the machine continuously to the canning or ultimate processing station.

It is desirable that no interruption take place in this continuous flow of the fruit or vegetable, and it is also highly desirable that the fruit and/or vegetable be not only thus processed, but that it be graded either as to quality or size, and also that the fruit be counted. The hand operators are paid by the piece-work. In addition, since each machine likewise carries a counter, which is automatically operated as the fruit is placed in the machine, it is desirable to have a double counting check as to the number of fruit pieces or vegetable pieces that flow to the canning station or ultimate station and the number of pieces which are fed into the machine.

The present invention resides in providing a means whereby the operators disposed in the fruit or vegetable flow line between the machines and the canning station are enabled not only to inspect, hand process, grade, and count the pieces, but also to accomplish these functions without interrupting the continuity of flow of the fruit or vegetable.

The apparatus forming one aspect of the present invention is likewise adaptable to other installations.

The invention therefore has for its object a carrying out of the foregoing and also to provide a simple, compact and efficient fruit grader and counter having peculiar adaptability for its association with a continuous flow line for conveying fruits and/or vegetables from one station to another, as hereinbefore illustrated.

These and other objects of the invention will be apparent from the following description when taken in connection with the accompanying drawings, wherein:

Fig. 1 is a view in elevation of a system embodying the invention.

Fig. 2 is a plan view of the system of Fig. 1.

Fig. 3 is a vertical section taken along the line 3—3 of Fig. 1.

Fig. 4 is a view in perspective of the separating and counting mechanism.

Fig. 5 is a fragmentary vertical section taken along the line 5—5 of Fig. 4.

Fig. 6 is a vertical section taken along the line 6—6 of Fig. 4.

Fig. 7 is a vertical section similar to Fig. 6, showing the operation of the mechanism.

In the system shown in Figs. 1 and 2, the fruit and/or vegetables to be processed are received in a processing machine 1 of any suitable type, such as disclosed in the various patents and pending applications of Mark Ewald, for example Patent No. 1,989,090 and application Serial No. 14,594, filed April 4, 1935, now Patent No. 2,161,807, dated June 13, 1939. In any of these machines a suitable counting mechanism 3 is attached to the mechanism which is adapted to receive and hold the fruit from the fruit receiving station, and contains a part automatically actuated by movement of the fruit gripping jaws as the operator places the fruit into the feeding jaws, whereby the fruit as it is fed into the machine is automatically counted. These machines suitably process the fruit or vegetable; in the case of fruit by peeling, splitting, coring or pitting the fruit in any desired sequence and ultimately discharging processed peeled whole fruit or cored or pitted half fruit onto or into a suitable conveying means.

In the system of Figs. 1 and 2, fruit from the processing machine 1 is fed by means of a chute 5 into a trimming trough 7 in which constantly circulates a supply of salt brine or water, the brine or water being fed to the ends of the trough 7 adjacent the machine 1 by means of a suitable pipe line and being discharged from the remote end to a similar suitable pipe line from which it is piped back to a tank for recirculation. A belt conveyor 9 extends longitudinally of the trough 7, as best shown in Fig. 2, and is driven by a drum 11 on an operating shaft 13 to a motor driven driving gear 15 and a driving gear 17 on the shaft.

A plurality of separating, sorting and counting mechanisms 2 are mounted at spaced points above the conveyor 9 throughout the length of the trimming trough and a waste trough 19 also extends longitudinally of the trimming trough on the opposite side from the conveyor 9. This waste trough 19 may be provided with a continuous circulation of any desired fluid for the purpose of carrying off the matter deposited therein as a result of the processing of the fruit by the operators stationed at the mechanisms 2. Processing operators are placed at each of the mechanisms 2 to remove fruit from the trimming trough to inspect the fruit and to process the same if necessary. Waste particles from this processing operation are placed in the waste trough.

Abutting the end of the trimming and waste troughs 7 and 19 a plurality of canning sinks 21 in longitudinal alinement therewith are provided to receive the fruit from the conveyor 9, and at each of these sinks there is provided an adjustable gate 23 for directing the fruit from the conveyor into the sink. Some of these gates are adjusted to direct fruit from one half of the belt into the associated canning sink, while others are adjusted to direct fruit from the other half of the conveyor into the other associated canning sink.

The separating or sorting and counting mechanism 2 comprises a hopper secured to a frame 4 mounted by legs 6 upon a suitable support or base 8. The hopper is divided into two fruit-receiving receptacles 10 and 12 by a partition or plate 14 secured, as by welding or otherwise, to the back wall 16 of the hopper and to an intermediate frame bar 18. The bottom of each receptacle 10 and 12 comprises a pair of inclined, converging plates 20 and 22, the front plate 22 at its lower end overlapping the plate 20 as more particularly shown in Figs. 4 and 5. The plates 20 are secured to a shaft or rod 24 journaled in the end members of the frame 4 and in the intermediate frame bar 18. A like shaft or rod 26 is journaled in the forward end of the frame 4 and the intermediate bar 18, and has rotatably secured thereto the forward plates 22. The rods 24 and 26 extend beyond both ends of the frame 4 and each rod at one end carries a counterweight 28 counterbalancing and normally urging the plates 20 and 22 to the closed position shown in Fig. 4. At its opposite end the rod 26 carries a crank arm 30 pivoted at its outer end to one end of a link 32, the other end of which is pivotally secured to a bell crank 34 secured on the same end of the shaft 24.

A counter 36 is mounted at the rear of the hopper upon a plate 38 carried by a bracket 40 secured in any convenient manner to the rear frame member of the frame 4. The operating lever 42 of the counter 36 is connected by a slotted link 44 to the bell crank 34. An adjustable counterweight 46, mounted on a threaded extension 48 of the bell crank 34, cooperates with the fixed counterweights 28 in normally urging the bottom plates 20 and 22 into closed position and controlling the operation of said plates under the weight of the fruit in the receptacles 10 and 12, as shown in Fig. 4.

The plate 38, upon which the counter 36 is mounted, is provided with vertical front, rear, and side flanges 50 spaced a slight distance inwardly from the edges of the plate 38. A dome-shaped housing 52, which prevents the entrance of water or other foreign matter into the counter, is pivotally secured to the plate 38 by slotted bars 54 secured to the opposite sides of the housing and through the slots in the bars 54 pass pins 56 secured to the under surface of the plate 38. The top of the housing 52 is cut away to provide a window 58, through which the readings of the counter 36 may be observed. This window is closed by a transparent sheet 60 of Celluloid or other suitable material, to prevent the entrance of water or other foreign matter into the housing. A lock 62 of any usual construction is carried by the front wall of the housing 52 and is adapted to lock the housing to the front flange 50 of the supporting plate 38.

A fruit-guiding plate 64 is secured to the front member of the frame 4 beneath the receptacle 10 of the hopper, and this plate has a vertical portion 66 secured to said frame member and a rearwardly directed inclined portion 68. A similar fruit-guiding plate 70 is mounted beneath the receptacle 12 of the hopper and this plate has a vertical portion 72 secured to the rear frame member of the frame 4 and a forwardly directed, downwardly inclined portion 74. The guiding plates 64 and 70 direct the fruit from their respective receptacles to and upon the conveyor 9 passing beneath and transversely of the hopper.

A suitable angle bar or plate 78 is secured to the horizontal members of the support or base 8 for each separating mechanism 2 and extends longitudinally and centrally of the conveyor and terminating at its rear end at a point in proximity to the first canning sink 21.

The mode of operation of my invention is as follows:

The fruit or vegetables are fed into the processing machine 1 which peels, splits, cores or pits the fruit in any desired sequence and ultimately discharges the processed, peeled whole fruit or cored or pitted half fruit into the trimming trough 7.

The fruit or vegetables, in being fed into the machine 1 are counted by the counting mechanism 3, which may be similar to the counting mechanism 36 and is automatically actuated by movement of the fruit gripping jaws as the operator places the fruit into the feeding jaws. A considerable quantity of the fruit fed into the trimming trough needs to be inspected and graded as to quality and size and also must be hand processed to remove portions of peel, core or pit that may not have been removed by the machine 1. This latter process is manually accomplished by the operators positioned adjacent the separating and counting mechanisms 2.

An operator stationed at one of these machines will remove the fruit from the trimming trough and after inspection and processing, if such is required, will deposit the fruit or vegetable in either compartment of a separating mechanism. For instance, if the piece of fruit or vegetable has the finest or grade "A" quality, the operator will place the fruit in the receptacle 10, and if the fruit be of inferior quality or grade "B," the operator will place the fruit in receptacle 12. In either case, the weight of the fruit upon the bottom plates 20 and 22 causes these plates to rotate oppositely and deposit the fruit upon the inclined portions 68 and 74 of the guide plates 64 and 70, whence the fruit gravitates to the conveyor 7. Fruit from the grade "A" receptacle 10, by reason of the chute, is deposited on the conveyor on one side of the center line, and fruit from grade "B" receptacle 12 is in a similar manner deposited on the conveyor on the opposite side of the center line. Therefore, as the fruit passes from the hopper it is conveyed by the belt 9 to the canning sink where the guides or gates 23 direct the same into the respective grade "A" or grade "B" canning stations 21, so that other operators located at each of said respective canning stations may further prepare the fruit or vegetables for canning and then place all of the grade "A" pieces in cans for grade "A" fruit and also place grade "B" pieces in other cans for grade "B" fruit.

In the initial depositing of the fruit from the conveyor 9 into the compartments 10 and 12, as the dumping plates 20 and 22 operate to deposit the fruit on the guide plates 64 and 70, the counter 76 is operated through the bell crank 34 and link 44, whereby an exact tally or count of the number of pieces of fruit processed by the operator having charge of that particular machine is maintained. The interconnection of the plates 20 and 22 through the crank 30 and the link 32 and the upper arm of the bell crank 34 insures the simultaneous and opposite rotation of said plates, thereby preventing clogging of the hopper and erroneous operation of the counter. The adjustable counterweight 46 is adjusted in accordance with the weight of the fruit to be assorted to insure proper operation of the plates 20 and 22.

The total number of pieces of fruit processed at all of the processing stations is computed and compared to the total number of pieces counted by the counter 3, whereby the accuracy of the several countings may be checked and the amount of waste determined.

It will be evident that in place of the trimming trough 7 a continuous belt extending parallel to the belt 9 may be substituted to convey the fruit from the processing machine 1 to the separating, sorting and counting mechanisms, or that, if desired, a flume or trough, extending parallel to the trough 7, in which circulates a continuous flow of brine, may be substituted for the belt 9, for the purpose of conveying the processed fruit from the separating and sorting mechanisms to the canning sinks.

It will be seen from the above description that applicant has provided an efficient method of handling fruit to be canned or otherwise processed, and has also provided a peculiarly simple, compact and efficient fruit separator and counter in which the fruit separator automatically controls the counter.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A fruit counter comprising a supporting frame, a hopper having rear, front and side walls secured to said frame and a partition separating said hopper into chambers for receiving fruit of different grades, a shaft journaled in said frame and extending across said chambers adjacent the rear wall of the hopper, a second shaft journaled in said frame and extending across said chambers adjacent the front wall of said hopper, a pair of oppositely directed bottom plates for each of said chambers one plate of each pair being connected to the front shaft and the other plate of said pair connected to the rear shaft for rotation therewith, each of said shafts having at one end a counterweight for counterbalancing the weight of the bottom plates attached thereto, a counter mounted upon said frame, means connecting said shafts for simultaneous equal and opposite rotation and operating linkages connecting one of said shafts to said counter to operate the same upon rotation of said bottom plates to discharge fruit from said hopper chambers.

2. A fruit counter comprising a supporting frame, a hopper having rear, front and side walls secured to said frame and a partition separating said hopper into chambers for receiving fruit of different grades, a shaft journaled in said frame and extending across said chambers adjacent the rear wall of the hopper, a second shaft journaled in said frame and extending across said chambers adjacent the front wall of said hopper, a pair of oppositely directed bottom plates for each of said chambers one plate of each pair being connected to the front shaft and the other plate of said pair connected to the rear shaft for rotation therewith, each of said shafts having at one end a counterweight for counterbalancing the weight of the bottom plates attached thereto, a counter mounted upon said frame, a bell crank mounted on the other end of the first shaft, a crank secured to the other end of said second shaft, a link pivotally connecting said crank to one arm of said bell crank, and a link pivotally connecting the other arm of said bell crank to said counter to operate the same upon rotation of said bottom plates to discharge fruit from said hopper chambers.

EDWARD W. THOMPSON.
HENRY A. SKOG.